(12) United States Patent
Ying

(10) Patent No.: US 8,036,719 B2
(45) Date of Patent: Oct. 11, 2011

(54) SYSTEM AND METHOD FOR POWER CONSUMPTION CONTROL IN A WIRELESS DEVICE

(75) Inventor: Wen-Ping Ying, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 527 days.

(21) Appl. No.: 12/199,941

(22) Filed: Aug. 28, 2008

(65) Prior Publication Data
US 2010/0056229 A1 Mar. 4, 2010

(51) Int. Cl.
H04W 88/02 (2009.01)
(52) U.S. Cl. ...................................... 455/574
(58) Field of Classification Search .................. 455/574, 455/343.1, 552.1; 370/311, 412; 714/760
See application file for complete search history.

(56) References Cited

U.S. PATENT DOCUMENTS

| | | | |
|---|---|---|---|
| 5,870,685 A * | 2/1999 | Flynn ............................ | 455/573 |
| 6,901,270 B1 * | 5/2005 | Beach ........................... | 455/563 |
| 7,333,829 B2 * | 2/2008 | Malone et al. ............. | 455/552.1 |
| 7,730,381 B2 * | 6/2010 | Butala et al. ................. | 714/760 |
| 2007/0178875 A1 * | 8/2007 | Rao et al. .................... | 455/343.1 |
| 2008/0291936 A1 * | 11/2008 | Lee et al. ....................... | 370/412 |
| 2009/0190513 A1 * | 7/2009 | Islam et al. ................... | 370/311 |
| 2009/0209196 A1 * | 8/2009 | Haverty ............................ | 455/1 |
| 2010/0304783 A1 * | 12/2010 | Logan et al. ............... | 455/552.1 |

OTHER PUBLICATIONS

Su-Lin Wu et al.; Incorporating Information from Syllable-Length Time Scales into Automatic Speech Recognition; International Computer Science Institute, 1947 Center Street, Suite 600, Berkeley, CA 94704 and the University of California at Berkeley, Berkeley, CA 94720, 1997.

* cited by examiner

Primary Examiner — Diane Mizrahi
(74) Attorney, Agent, or Firm — Moazzam & Associates, LLC

(57) ABSTRACT

A technique for controlling power consumption in a wireless device detects data frames indicating a pause in the reception of speech frames from the wireless network. The mobile unit places the receiver circuitry in a low-power or sleep mode to thereby reduce processor cycles and save battery power. At the end of a time period, the receiver circuitry awakens to receive and process additional speech frames or to return to the low-power mode if no additional speech signals have been received.

21 Claims, 4 Drawing Sheets

TX Types: "S" = SPEECH; "F" = SID_FIRST; "U" = "SID_UPDATE; "N" = NO DATA
$N_{elapsed}$ : No. of elapsed frames since last SID_UPDATE

SYSTEM AND METHOD FOR POWER CONSUMPTION CONTROL IN A WIRELESS DEVICE

BACKGROUND OF THE INVENTION

1. Field of the Invention

The present invention is directed generally to power control in a wireless device and, more particularly, to a system and method to control power consumption in receiver circuitry in a wireless device.

2. Description of the Related Art

Wireless communication devices, such as cellular telephones, are typically battery-powered. As such, an important design criteria is the minimization of power consumption by the battery-powered wireless communication device.

In a circuit-switched communication network, a continuous communication link is established between the wireless communication device and the communication network for the duration of the phone call. The wireless communication device includes a transmitter and a receiver to provide the bi-directional communication link with the communication network. In the past, power control and power consumption reduction had focused on the transmitter within the wireless device. Because the transmitter power can be significant, these efforts are well-founded. When the user is not speaking, the wireless communication device can reduce its transmitting power to thereby conserve battery power.

Although a reduction in transmitter power provides a savings, those skilled in the art will appreciate that other portions of circuitry within the wireless communication device consumes significant amounts of power. Therefore, it can be appreciated that there is a significant need for a system and method to control power consumption within the wireless communication device. The present invention provides this and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

It is known in the art that reduction of transmit power in a wireless communication device will increase battery life. However, it is also possible to improve power consumption characteristics by selectively powering down portions of processing circuitry. Those skilled in the art will appreciate that power consumption by microprocessors within the wireless communication device also have a significant impact on power consumption. As will be discussed in greater detail below, the present invention is directed to techniques for powering down portions of the receiver and speech processing circuitry to thereby reduce processor cycles and, subsequently, reduce power consumption by the wireless communication device.

Figure 1:
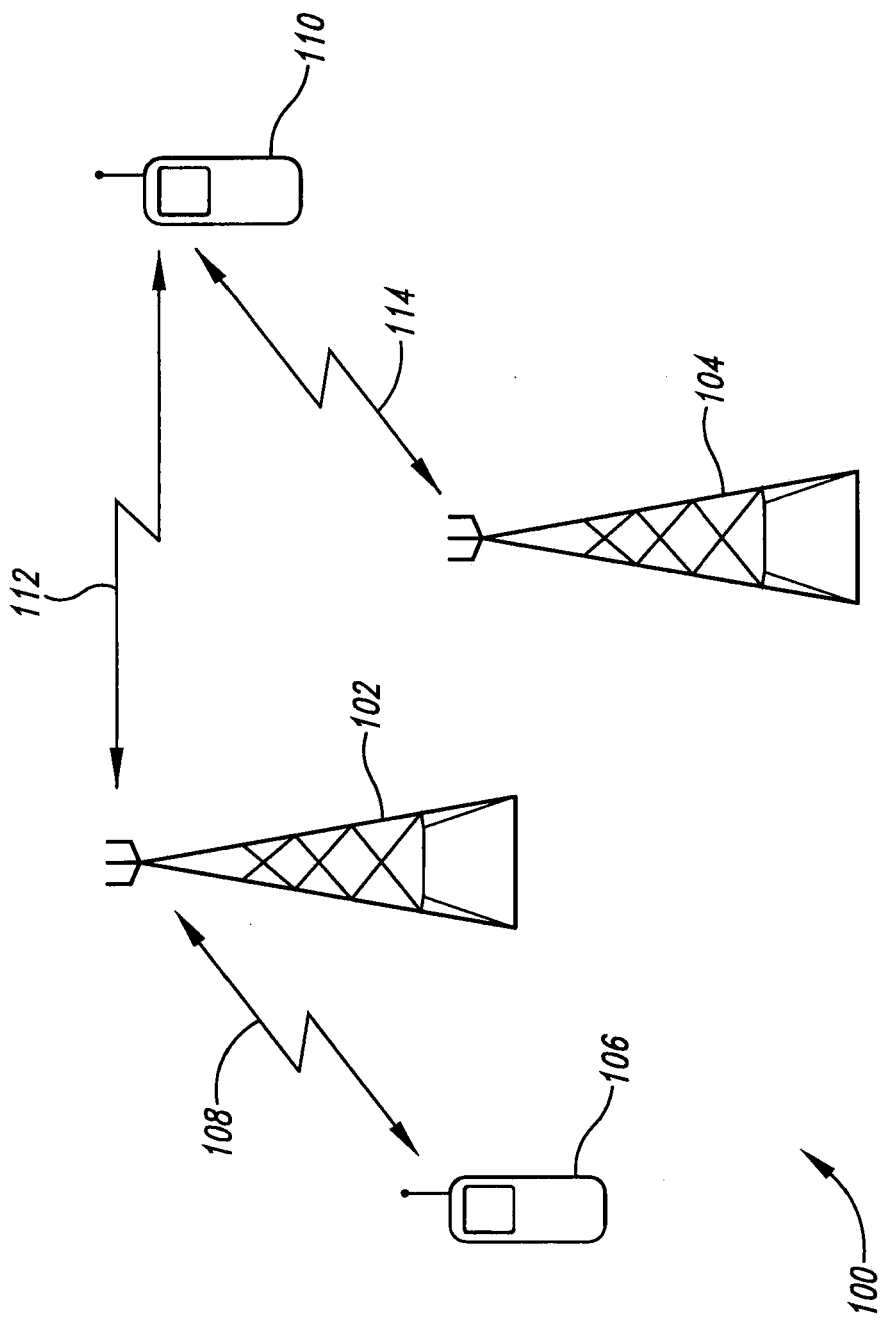
FIG. 1 is a simplified illustration of a system architecture in which wireless communication devices are designed in accordance with the present teachings.

FIG. 1 illustrates a simplified system architecture of a system 100 constructed in accordance with the present teachings. The system 100 shows a base station 102 and the base station 104. Those skilled in the art will recognize that a typical system has many more base stations and mobile users as well as other control and management functionality. However, for the sake of simplicity, FIG. 1 shows only the base stations 102 and 104. Furthermore, the base station controller, including transmitter, receiver, and control circuitry, is not shown. Those components are well known in the art and need not be described here.

FIG. 1 also illustrates a mobile unit 106, which communicates with the base station 102 via a communication link 108. Similarly, a mobile unit 110 is able to communicate with both the base station 102 and the base station 104. Using conventional technology the mobile unit 110 will communicate either with the base station 102 via a communication link 112 or with the base station 104 via a communication link 114. The devices 106 and 110 are referred to herein as "mobile units" because such devices are typically battery-powered. However, the principals of the present application may be applied to any battery powered wireless communication device (mobile or fixed-location devices).

Figure 2:
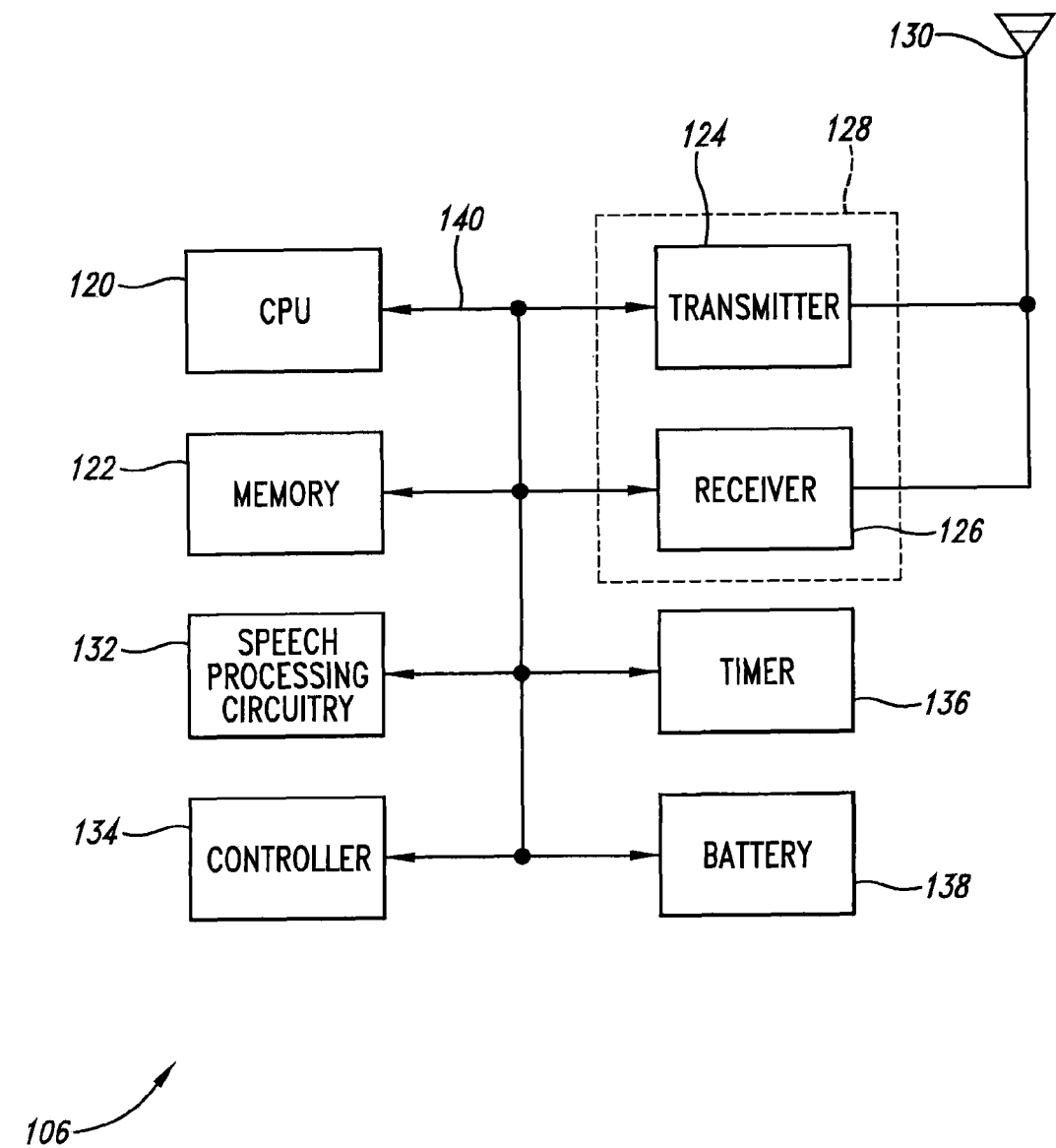
FIG. 2 is a functional block diagram of a wireless communication device constructed in accordance with the present teachings.

FIG. 2 is a functional block diagram illustrating selected components of a mobile unit (e.g. the mobile unit 106). The mobile unit 106 includes a central processing unit (CPU) 120 and memory 122. In general, the memory 122 stores data and instructions that control operation of the CPU 120. The CPU 120 may be implemented using a variety of known technologies. For example, the CPU 120 may be a conventional microprocessor, a microcontroller, a digital signal processor (DSP), a programmable gate array (PGA), custom circuit, or the like. The mobile unit 106 is not limited by the specific form of the device used to implement the CPU 120.

Similarly, the memory 122 may be implemented using a variety of known technologies. The memory 122 may include random access memory (RAM), read-only memory, flash memory, programmable memory, or the like. In one embodiment, a portion of the memory 122 may be integrated into a device with the CPU 120. The mobile unit 106 is not limited by the specific form of components used to implement the memory 122.

The mobile unit 106 also includes a transmitter 124 and receiver 126 such as may be used for normal wireless communication with the wireless network 100 (see FIG. 1). In a typical embodiment, the transmitter 124 and receiver 126 may be implemented as a transceiver 128. The transceiver 128 is coupled to an antenna 130. Operation of the transceiver 128 and the antenna 130 is well known in the art and need not be described in greater detail herein. However, those skilled in the art will appreciate that the principals of the present disclosure are applicable to various wireless communication standards and various multiple-access techniques. Depending upon implementation details, it may be possible to totally shut down the receiver 126, or at least portions of the receiver, in order to conserve battery power. Shut down of the receiver 126 will be discussed in greater detail below.

The mobile unit 106 also includes a speech processing circuitry 132 and a controller 134. As will be described in greater detail below, the controller 134 processes data frames received by the receiver 126 and determines when incoming data frames received by the receiver 126 contain no speech data. In this situation, the controller 134 causes the speech processing circuitry 132 to enter a low power operational mode to thereby conserve battery power.

The mobile unit 106 also includes a timer 136. The controller 134 may utilize the timer 136 to periodically activate the speech processing circuitry 132. The mobile unit 106 also includes a battery 138 to power the device.

Some components illustrated in FIG. 2, such as the speech processing circuitry 132, controller 134, and timer 136, may be implemented by instructions contained in the memory 122 and executed by the CPU 120. However, these are illustrated as separate blocks in the functional block diagram of FIG. 2 since component performs a separate operational function.

The various components illustrated in FIG. 2 are coupled together by a bus system 140. The bus system 140 may comprise an address bus, data bus, control bus, power bus, and the like. For the sake of convenience, the various buses are illustrated in FIG. 2 as the bus system 140.

When the mobile unit 106 receives a data frame from the wireless network 100 (see FIG. 1) indicating that no speech data is available, the controller 134 shuts down the operation of most or all of the speech processing circuitry 132. The controller 134 periodically powers up the speech processing circuitry at certain time intervals, to check for new incoming speech data. Those skilled in the art will appreciate that the shutdown of the speech processing circuitry 132 saves processing cycles in the CPU 120 and, thereby conserves energy in the battery 138.

The examples presented herein are directed to a process for shutting down all or part of the speech processing circuitry 132, it is possible to shut down all or part of the receiver 126 as well. As used herein, the term "receiver circuitry" is intended to include all or part of the receiver 126 that may be powered down as well as all or part of the speech processing circuitry 132 that may be powered down. Shutting down all or part of the receiver 126 would result in additional power savings. For example, implementation of the mobile unit 106 in accordance with the present teachings permits a total shut down of the receiver 126 if the mobile unit is part of a 2G communication system or is a voice-only device. For example, in a 2G implementation, each mobile unit is assigned a specific time slot to communicate with the wireless network 100. After communicating in its assigned time slot, the mobile unit 106 may shut down the receiver 126 in order to conserve battery power. The mobile unit 106 may wake up just prior to its assigned time slot to allow a sufficient period of time for the receiver 126 to synchronize with the network 100.

Other communications systems, such as 3G, utilize both circuit switched and packet switched communication protocols. With the dual communication protocol, it is unfeasible to shut down the entire receiver 126. Thus, while the following examples refer to the speech processing circuitry 132, it should be clear to those skilled in the art that portions or all of the receiver 126 may also be shut down to conserve battery power.

In wireless systems, if no speech data is actively being transmitted by a wireless network, the mobile unit could become very quiet. It has been found that users are unsettled by a total lack of noise generated by the mobile unit during periods where no speech data is being transmitted. To overcome this unsettling perception, the wireless network transmits data frames with information that allows the speech processing circuitry within the mobile unit to generate a background noise level. This background noise, sometimes referred to as a "comfort noise," provides a background noise to indicate to users that the circuits are still connected.

The mobile unit 106 shuts down most of the speech processing circuitry 132, but maintains some functionality in the signal processing circuitry 132 to generate a comfort noise level that may be periodically updated by the wireless network 100. The mobile unit 106 cannot process incoming data frames received by the receiver 126 during the low power operation, or the receiver 126 is partially down so that no user data receiving function exists to allow reception of the incoming data frames. The mobile unit 106 may miss a data frame with updated comfort noise level information. To overcome this shortcoming, the mobile unit 106 internally generates a comfort noise level that may be maintained at a set level until it is periodically updated by the wireless network 100.

Figure 3:
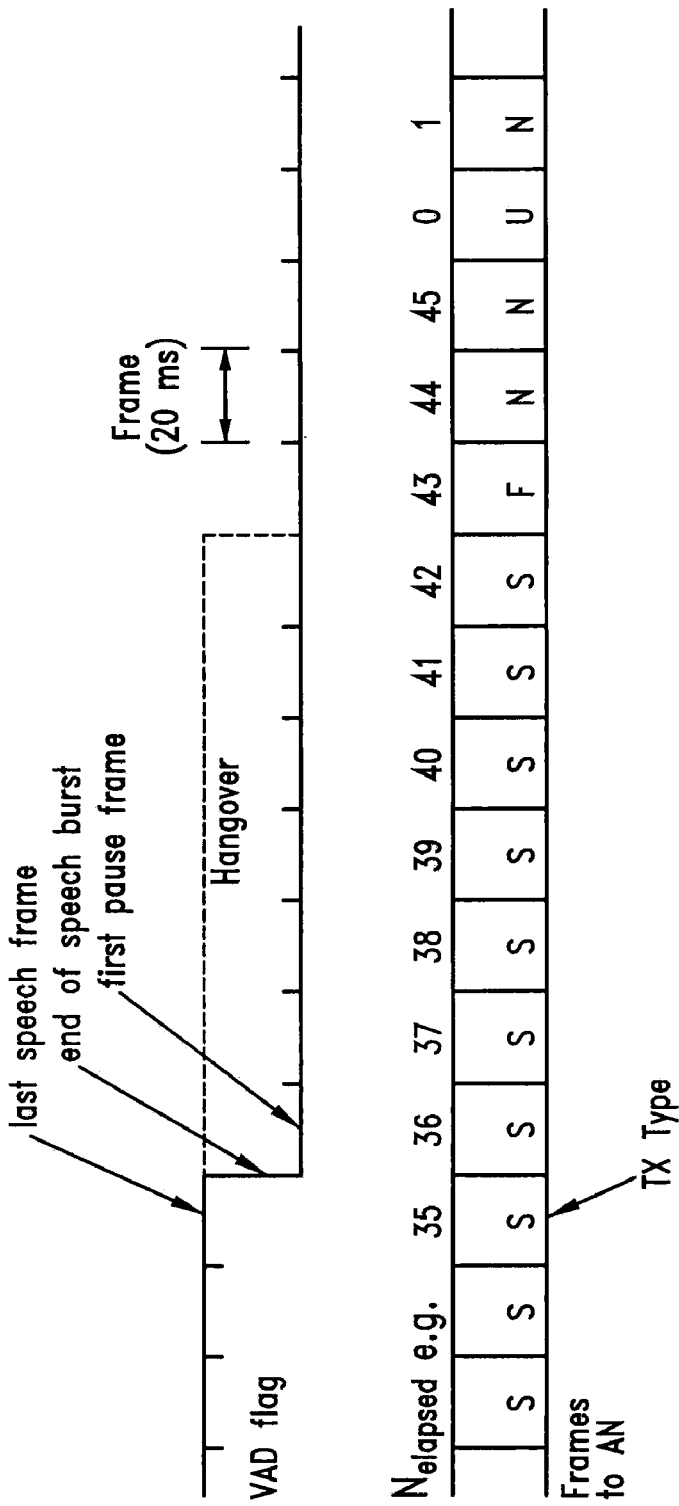
FIG. 3 is a diagram illustrating the timing of data frames transmitted within the wireless communication system of FIG. 1.

FIG. 3 illustrates data frame timing for an example speech processing protocol. The examples provided herein use a communication protocol known as Adaptive Multi-Rate (AMR), which utilizes a set of communication protocols and speech codec functions. An industry standard, known as 3GPP provides technical specifications for AMR functionality. Using an AMR speech codec, data frames are transmitted every 20 msec. In addition, a Voice Activity Detector (VAD) flag indicates whether a data frame contains speech data. It should be noted that FIG. 3 is taken directly from the 3GPP TS 26.101 standard and illustrates signaling from the perspective of the transmitting device. That is, the VAD flag is a signal generated within the transmitting device. The transmitted data frames illustrated in FIG. 3 are ultimately transmitted to the receiving device (e.g., the mobile unit 106).

As illustrated in FIG. 3, the VAD flag goes to 0 to indicate the end of a speech burst. In accordance with the 3GPP TS 26.093 standard, a silence descriptor (SID) data frame will be transmitted. It requires eight data frames to construct a new SID data frame. This is illustrated in FIG. 3 as a "hangover" period in which, after the end of the speech burst, the speech data frames with actual background noise only are transmitted until the eighth data frame when the noise signature can be computed and be embedded in the newly constructed SID data frame for transmission. Thus, the first indication of a pause in speech activity detected by the receiving device (e.g., the mobile unit 106) is the reception of the first SID data frame. During a pause in speech activity, an updated SID data frame is generated every eighth frame. Thus, an updated SID data frame will be transmitted every 160 msec (i.e., 8 frames× 20 msec/frame).

In accordance with the teachings herein, the controller 134 (see FIG. 2) detects the transmission of the first SID data frame and, in response to the detection of the first SID data frame, effectively shuts down operation of the speech processing circuitry 132. In a simple embodiment, the controller 134 will maintain the speech processing circuitry 132 in this low power operational mode for 160 msec. This corresponds to the expected delay between the receipt of the first SID data frame and the updated SID data frame. The timer 136 may be used to measure the elapsed time.

It should be noted that during the period in which the speech processing circuitry 132 is in a low power operational mode, the receiver 126 may be put into a reduced power state with active circuitry enough to maintain synchronization between the mobile unit 106 and the wireless network 100. Regardless if parts of the receiver 126 can be shut down or not, in this present invention, the speech processing circuitry 132 that processes data frames received by the receiver represents the functionality that is affected by the controller 134. That is, the controller 134 shuts down the speech processing circuitry 132 during periods of speech inactivity.

In the embodiment discussed above, the speech processing circuitry 132 is placed in a low power mode for 160 msec.

This corresponds to the expected elapsed time between the first SID data frame and an updated SID data frame. However, the down time for the speech processing circuitry 132 may be dynamically and adaptively adjusted such that it is tailored to fit the tempo of the conversation and thereby avoid excessive loss of speech data frames. In this embodiment, the controller 134 does not immediately shut down the speech processing circuitry 132 upon receipt of the first SID data frame at the start of a phone conversation. Rather, the controller 134 may monitor the intervals between the occurrence of every SID data frame (regardless of SID frame types) that has an immediate next SPEECH data frame. The controller may use this number to determine the approximate "off" period for the speech processing circuitry 132 after the receipt of each SID frame. For example, if the average time between every SID data frame with an immediate next SPEECH data frame and that speech frame is 100 msec, the speech processing circuitry 132 may be placed in the low-power optional mode for 5 frames (i.e., 100 msec) after the SID data frame instead of 8 frames (i.e., 160 msec) to avoid potential degrading of voice signal quality.

The controller 134 may monitor the speech signals for several SID transmissions to determine an average time between the transmission of the SID data frame and the next immediate speech frame. This allows the controller 134 to select an appropriate interval time during which the speech processing circuitry 132 will be in a low power mode.

During the course of a telephone conversation, the controller 134 may repeat this process and dynamically adjust the time interval during which the speech processing circuitry 132 is shut down. For example, the initial calculation by the controller may indicate that speech resumes, on average, 5 data frames after the receipt of the last SID data frame. However, later in the telephone conversation the controller 134 may repeat these measurements and determine that, on average, speech resumes 7 data frames after the last SID data frame. Usually this process, the controller 134 may adaptively adjust the period of time in during which the speech processing circuitry 132 is shut down. Those skilled in the art will appreciate that the adaptively adjusting procedure described above may result in a shorter or longer shut down time period for the speech processing circuitry 132, In the example embodiment described herein, it is desirable for the speech processing circuitry 132 to receive and process all SID data frames. Thus, in this example, the timing of the on-off cycle for the speech processing circuitry is designed with reference to the SID data frames. In this particular embodiment, the maximum off time for the speech processing circuitry 132 is 160 msec, which corresponds to the length of time between SID data frames. That is, the speech processing circuitry 132 is designed to return to an active state in time to receive the next transmitted SID data frame.

As an alternative to measuring the average interval between the occurrence of an SID frame and the immediate next SPEECH data frame, it is possible to measure a number of time intervals and select the minimum time interval. For example, consider the measurement of 3 time intervals (in increments of 20 msec data frames) having intervals of 3, 4, and 7 data frames. An average of these 3 interval times is 4.66 data frames. The mobile unit in one embodiment could select 4 data frames (i.e., round down) or select 5 data frames (i.e., round up). Alternatively, the mobile unit could select the minimum number of frames found in the measurement period. In the example above, the minimum interval time is 3 data frames. Accordingly, the controller 134 could set the timer 136 (see FIG. 2) for 60 msec delay, corresponding to 3 data frames. Alternatively, it is possible to select the maximum interval time. In the example above, 7 data frames was the maximum measured interval time between the SID frame and the next immediate SPEECH data frame. In yet another alternative embodiment, the mobile unit 106 can be configured to select the maximum number of data frames that does not exceed the 160 msec delay time that occurs between SID data frames (i.e., 8 data frames). Thus, the mobile unit 106 can be configured in a number of different ways to determine the appropriate time interval for the timer 136. In addition, as noted above, the measurement could be preformed once at the beginning of the telephone conversation and applied throughout the conversation. Alternatively, the mobile unit may periodically recalculate the appropriate delay time using any of the techniques described above.

During the period of time in which the speech processing circuitry 132 is not processing data frames received by the receiver 126, the speech processing circuitry 132 may be active to generate a comfort noise level in accordance with the received SID data frame. However, the comfort noise level generated by the mobile unit 106 differs from the conventional comfort noise level in that it will maintain a previous comfort noise level if an SID update frame is missed.

As described above, the speech processing circuitry 132 (see FIG. 2) may be shut down for a fixed period of time (e.g., 160 msec) or a variable length of time calculated by the controller 134. However, those skilled in the art will appreciate that speech is asynchronous in nature. That is, the average time between the end of a speech burst and the start of the next immediate speech data frame may be, by way of example, 5 data frames. However, the speaker may have a shorter pause in the speech. For example, while the average may be 5 data frames in a particular telephone call, the speaker may resume speaking in only 3 data frames. Because the speech processing circuitry 132 is shut down for a longer period of time, it is possible that some speech data frames will be missed by the mobile unit 106.

When the time period has expired, the controller 134 activates the speech processing circuitry 132. The next received data frame is analyzed by the controller 134. If the received data frame is an SID data frame, the controller 134 may allow the speech processing circuitry 132 to remain in the low power state. If the data frame received is a NO_DATA frame or is the data frame received with an error, the speech processing circuitry 132 remains active and receives additional data frames until a valid data frame is received. During this period, the same comfort noise level is generated in the background for the user of the mobile unit 106.

The 3GPP standard provides for error concealment in the event that there is an error in the received SPEECH data frame or a missing or erroneous SID data frame. However, the 3GPP standard does not contemplate the possibility of missing data frames due to the fact that the speech processing circuitry 132 or the receiver 126 may be in a low-power mode. However, the system 100 does provide for such error concealment. Once a valid data frame is received, and it is a SPEECH data frame, the speech processing circuitry 132 processes the just received SPEECH data frame, but attenuates the signal level to avoid a sudden burst of speech. The signal level for the received SPEECH frames are ramped up over the next few data frames. At the same time, the speech processing circuitry 132 may ramp down the level of the simulated noise for the comfort noise level. In this manner, the SPEECH frames increase in signal level while the comfort noise level decreases. Thus, the missing or erroneously received speech data frames are not recovered. However, the effects of missing data frames are reduced by these error concealment techniques.

As noted above, the 3GPP standard provides for error concealment in certain circumstances. Any missing speech frames that were not received during active cycle due to transmission error or missing SID frames that were not received while the speech processing circuitry 132 or receiver 126 were shut down, may be recovered using mechanisms described in 3GPP TS 26.091 specification for the purpose of error concealment. These mechanism are not intended to recover the speech signal, but to avoid annoyance during the interruption of the speech or generated comfort noise generation.

In a worst case scenario, valid speech activity could resume 20 msec after the last SID frame was received. In this scenario, if the speech processing circuitry 132 is put to sleep and wakes up no later than 160 msec later, the speech processing circuitry 132 may miss, in this worst case scenario 140 msec worth of speech frames (i.e., 7 speech frames). Psychoacoustic and psycholinguistic studies suggest that a syllable in human speech plays a central role in the perception of human speech. In a study conducted in 1997, it was shown that in conversational English speech, nearly 80% of syllables have a duration between 100-250 msec. *Incorporating Information From Syllable Length Time Scales Into Automatic Speech Recognition*, Su-Lin Wu, Brian E. D. Kingsbury, Nelson Morgan and Steven Greenberg; International Computer Science Institute, University of California at Berkeley, Berkeley, Calif., 1997. This study suggests that the information lost in the worst case scenario described above (i.e., 140 msec or 7 speech frames) may not have a significant impact on human speech recognition. In addition, with the gradual ramp up of speech level and the attenuation or ramp down of comfort noise level, the impact to the perceived quality of voice is minimized.

Figure 4:
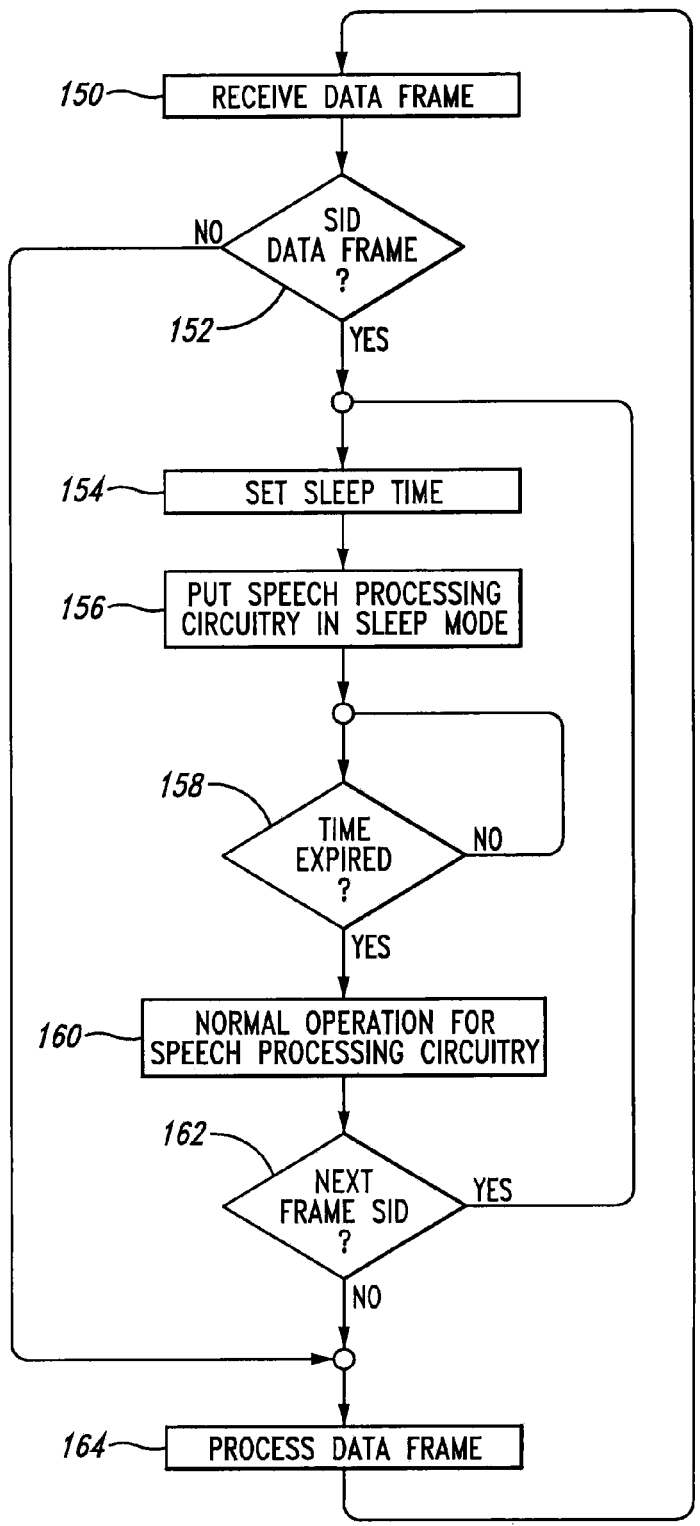
FIG. 4 is a flow chart illustrating the operation of the wireless communication device to reduce overall power consumption.

The operation of the mobile unit 106 is illustrated in the flow chart of FIG. 4. At a start, the mobile unit 106 is under power and is already registered with the wireless network 100 (see FIG. 1). Those skilled in the art will appreciate that the registration process depends on the particular communication technology and particular service provider. However, those processes are within the knowledge of one of ordinary skill in the art and need not be described herein. At step 150, the mobile unit receives a data frame from the wireless network 100. In decision 152, the controller 134 determines whether the received data frame is an SID data frame. An SID data frame indicates a pause in transmitted SPEECH data frames. If the result of decision 152 is NO, the mobile unit processes the received data frame in a normal manner. That is, the received data frame is processes in step 164.

If the received data frame is identified as an SID data frame, the result of decision of 152 is YES. In that event, the mobile unit 106 sets a time delay in step 154 and, in step 156, the speech processing circuitry 132 is shut down. This process may be referred to as a "low-power" mode, a "sleep" mode, or the like. However, in essence, portions of receiving chain circuitry including, but not limited to, the speech processing circuitry 132 or computer instructions that process the individual data frames are not executed during this interval period thus saving processor cycles and power to the battery 138. Various techniques for determining the interval time for the timer 136 (see FIG. 2) have been described in detail above.

In decision 158, the mobile unit 106 determines whether the interval time has expired. If the time has not yet expired, the result of decision 158 is NO, and the process returns to decision 158 until the time has expired.

If the interval time has expired, the result of decision 158 is YES and, in step 160, the speech processing circuitry 132 resumes normal operation. In decision 162, the controller determines whether the next received data frame is an SID data frame. If the next received data frame is a SID data frame, the result of decision 162 is YES and the process returns to step 154 to again set the delay time and place the speech processing circuitry 132 in a sleep mode.

If the next immediate data frame is not an SID data frame, the result of decision 162 is NO and the mobile unit 106 processes the data frame in a normal manner in step 164. The process thereafter returns to step 150 to receive the next data frame and continue the process for the duration of the telephone call.

As previously discussed, processing of a data frame after awakening from the sleep mode may be done in a conventional manner. Alternatively, if the next immediate data frame is a SPEECH data frame, the speech processing circuitry 134 may attenuate the signal and ramp up the signal level over the next several speech data frames so as to provide a smooth transition from the comfort level background noise to normal speech data frames. At the same time, the speech processing circuitry 132 may be attenuating the level of the comfort noise signal.

By shutting down the speech processing circuitry 132 (see FIG. 2), the mobile unit saves processing cycles and reduces over all battery power consumption. Shutting down the speech processing circuitry is expected to have a minimal effect on speech intelligibility.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for controlling power consumption in a wireless communication device in a circuit-switched communication network, comprising:
    receiving a data frame indicating no voice activity;
    monitoring received data frames after receiving the data frame indicating no voice activity to calculate a time period of no voice activity, and, after calculating the time period of no voice activity, placing a portion of receiver circuitry in a low-power mode based on the calculated time period; and
    activating the receiver circuitry portion to check for a resumption of voice activity.

2. The method of claim 1, wherein the portion of the receiver circuitry is speech-processing circuitry that operates in the low-power mode for 160 milliseconds.

3. The method of claim 1, wherein calculating the time period of no voice activity comprises calculating an average time period of no voice activity.

4. The method of claim 1, wherein activating the receiver circuitry comprises checking a frame type of a next data frame received by the wireless communication device upon activating the receiver circuitry and, if the next data frame is a speech data frame, attenuating a signal level of the speech data frame.

5. The method of claim 4, further comprising gradually increasing the signal level of subsequent speech data frames following the attenuated speech data frame.

6. The method of claim 4, further comprising gradually decreasing a comfort level signal generated within the wireless communication device during subsequent speech data frames following the attenuated speech data frame.

7. The method of claim 1, wherein the receiver circuitry operates in accordance with an Adaptive Multi-Rate (AMR) protocol.

8. The method of claim 1, further comprising checking a data frame for resumption of voice activity upon activating the receiver circuitry.

9. The method of claim 8, wherein checking a data frame for resumption of voice activity comprises checking a frame type of a next frame received by the wireless communication device upon activating the receiver circuitry to determine if the frame type is a speech frame.

10. The method of claim 1, further comprising generating a comfort level signal within the wireless communication device while the receiver circuitry is in the low-power mode.

11. The method of claim 10, wherein the comfort level signal is generated within the wireless communication device using parameters transmitted to the wireless communication device.

12. A method for controlling power consumption in a wireless communication device in a circuit-switched communication network, comprising:
    receiving a data frame indicating no voice activity;
    monitoring received data frames after receiving the data frame indicating no voice activity to calculate a time period of no voice activity and, after calculating the time period of no voice activity, placing a portion of receiver circuitry in the low-power mode based on the calculated time period; and
    activating the receiver circuitry to check a frame type of a next data frame received by the wireless communication device and, if the next data frame is a speech data frame, maintaining activation of the receiver circuitry.

13. The method of claim 12, further comprising returning to the low-power mode if the frame type of the next data frame is a frame indicating continued lack of speech.

14. The method of claim 12, wherein activating the receiver circuitry comprises checking a frame type of a next data frame received by the wireless communication device upon activating the receiver circuitry and, if the next data frame is a speech data frame, attenuating a signal level of the speech data frame.

15. The method of claim 14, further comprising gradually increasing the signal level of subsequent speech data frames following the attenuated speech data frame.

16. The method of claim 14, further comprising gradually decreasing a comfort level signal generated within the wireless communication device during subsequent speech data frames following the attenuated speech data frame.

17. The method of claim 12, further comprising generating a comfort level signal within the wireless communication device while the receiver circuitry is in the low-power mode.

18. A wireless communication device operable in a communication network, comprising:
    a transmitter to transmit data from the wireless device to the communication network;
    a receiver to receive data from the communication network, the received data comprising a series of data frames;
    a speech-processor configured to process the received data frames; and
    a controller configured to analyze the received data frames and to detect a data frame indicating no voice activity, the controller configured to place the speech-processor into a low-power operational mode upon detection of the data frame indicating no voice activity and subsequently activating the speech-processing circuitry to check for a resumption of voice activity;
    wherein the receiver is configured to check a frame type of a next data frame received by the receiver communication device upon activating the speech-processor and, if the next data frame is a speech data frame, attenuating a signal level of the speech data frame.

19. The device of claim 18, wherein the controller is further configured to place the receiver into a low-power operational mode upon detection of the data frame indicating no voice activity.

20. The device of claim 18, wherein the speech-processor is further configured to gradually increase the signal level of subsequent speech data frames following the attenuated speech data frame.

21. The device of claim 18, wherein the speech-processor is further configured to gradually decrease a comfort level signal generated within the wireless communication device during subsequent speech data frames following the attenuated speech data frame.

* * * * *